(12) United States Patent
Smith et al.

(10) Patent No.: US 10,198,860 B1
(45) Date of Patent: Feb. 5, 2019

(54) AUTOMATED THREE DIMENSIONAL (3D) MESH UV COORDINATE TRANSFER PROCESS

(71) Applicant: The Boeing Company, Chicago, IL (US)

(72) Inventors: Zachary R. Smith, Hanahan, SC (US); Anthony W. Baker, Gilbertsville, PA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/811,467

(22) Filed: Nov. 13, 2017

(51) Int. Cl.
*G06T 15/04* (2011.01)
*G06T 17/20* (2006.01)

(52) U.S. Cl.
CPC ............ *G06T 17/205* (2013.01); *G06T 15/04* (2013.01)

(58) Field of Classification Search
CPC .......... G06T 1/20; G06T 15/04; G06T 17/205
USPC .......................... 345/418, 419, 420, 473, 582
See application file for complete search history.

(56) References Cited

U.S. PATENT DOCUMENTS

| 2007/0159486 | A1* | 7/2007 | Sasaki | G06T 13/40 345/473 |
| 2017/0064284 | A1* | 3/2017 | Auclair | G06T 11/60 |
| 2017/0301110 | A1* | 10/2017 | Auclair | A63F 13/00 |

OTHER PUBLICATIONS

M.S. Floater et al, "Surface Parameterization: a Tutorial and Survey", 2005, Advances in Multiresolution for Geometric Modeling, pp. 157-183.
N. Ho, "Finding Optimal Rotation and Translation between Corresponding 3D Points", May 10, 2013, available via the Internet at nghiaho.com/?page_id=671 (last visited Oct. 9, 2017).
B. Levy et al, "Least Squares Conformal Maps for Automatic Texture Atlas Generation", Jul. 23, 2002, Proceedings of the 29th Annual Conference on Computer Graphics and Interactive Techniques (SIGGRAPH), pp. 362-371.
Wikimedia Foundation, "Conformal Map", Aug. 19, 2017, available via the Internet at en.wikipedia.org/w/index.php?title=Conformal_map&oldid=796301267 (last visited Sep. 7, 2017).
(Continued)

*Primary Examiner* — Jacinta M Crawford
(74) *Attorney, Agent, or Firm* — McDonnell Boehnen Hulbert & Berghoff LLP

(57) ABSTRACT

An apparatus and related methods for applying two-dimensional (2D) texture maps onto three-dimensional (3D) objects are described. A computing device can receive differing first and second meshes representing respective first and second 3D objects and a 2D texture associated with the first 3D object. The computing device can determine correspondence points between the first and second meshes and can align the first and second meshes using an alignment transformation based on the correspondence points. The computing device can determine texture portions of the 2D texture associated with first corresponding portions of the first mesh. The computing device can assign the texture portions to second corresponding portions of the aligned second mesh. For each texture portion, the computing device can: project the texture portion onto a 2D plane related to a particular second corresponding portion and fit the projected texture portion to the particular second corresponding portion.

20 Claims, 10 Drawing Sheets

(56) References Cited

OTHER PUBLICATIONS

Wikimedia Foundation, "Least Squares Conformal Map", Jun. 10, 2014, available via the Internet at en.wikipedia.org/w/index.php?title=Least_squares_conformal_map&oldid=612384923 (last visited Sep. 7, 2017).

Wikimedia Foundation, "UV mapping", Jul. 2, 2017 available via the Internet at en.wikipedia.org/w/index.php?title=UV_mapping&oldid=788653740(last visited Sep. 7, 2017).

* cited by examiner

US 10,198,860 B1

AUTOMATED THREE DIMENSIONAL (3D) MESH UV COORDINATE TRANSFER PROCESS

FIELD

The present disclosure generally relates to the use of texture maps, and more particularly, to application of two dimensional (2D) texture maps having a UV coordinate system onto three dimensional (3D) objects.

BACKGROUND

In computer graphics, a technique called texture mapping can be used to apply data from a 2D surface or "texture" to one or more portions of a 3D object, thereby coloring or "texturing" the 3D object. Texture mapping can be used to add representations of color, text, shading, and perhaps other graphical properties to the 3D object. The 2D texture can be described using a "UV" coordinate system based on a U axis and a V axis, where the U axis is a horizontal axis for the texture, and the V axis is a vertical axis for the texture. The 3D object can be described using an X axis as a horizontal axis for the object, a Y axis as a vertical axis for the object and a Z axis as a depth axis for the object.

SUMMARY

In an example embodiment, a method is described. A computing device receives a first mesh representing a first three-dimensional (3D) object, a two-dimensional (2D) texture associated with the first 3D object, and a second mesh representing a second 3D object, where the first mesh differs from the second mesh. The computing device determines one or more correspondence points on each of the first mesh and the second mesh. The computing device aligns the first mesh with the second mesh based on an alignment transformation. The alignment transformation is determined based on the one or more correspondence points. The computing device determines one or more texture portions of the 2D texture associated with one or more corresponding portions of the first mesh. The computing device assigns the one or more texture portions of the 2D texture to one or more corresponding portions of the aligned second mesh. For each particular texture portion of the one or more texture portions, the computing device: projects the particular texture portion onto a 2D plane related to a particular corresponding portion of the one or more corresponding portions of the aligned second mesh, and fits the projected particular texture portion to the particular corresponding portion of the aligned second mesh.

In another example embodiment, a system is described. The system includes a computing device. The computing device includes one or more processors and one or more non-transitory computer-readable media. The one or more non-transitory computer-readable media have computer-readable instructions stored thereon that, when executed by the one or more processors, cause the computing device to perform functions. The functions include: receiving a first mesh representing a first 3D object, a 2D texture associated with the first 3D object, and a second mesh representing a second 3D object, where the first mesh differs from the second mesh; determining one or more correspondence points on each of the first mesh and the second mesh; aligning the first mesh with the second mesh based on an alignment transformation, where the alignment transformation is determined based on the one or more correspondence points; determining one or more texture portions of the 2D texture associated with one or more corresponding portions of the first mesh; assigning the one or more texture portions of the 2D texture to one or more corresponding portions of the aligned second mesh; and for each particular texture portion of the one or more texture portions: projecting the particular texture portion onto a 2D plane related to a particular corresponding portion of the one or more corresponding portions of the aligned second mesh, and fitting the projected particular texture portion to the particular corresponding portion of the aligned second mesh.

In a further example embodiment, an article of manufacture is provided. The article of manufacture includes a non-transitory computer-readable medium having instructions stored thereon that, when executed by one or more processors of a computing device, cause the computing device to perform functions. The functions include: receiving a first mesh representing a first 3D object, a 2D texture associated with the first 3D object, and a second mesh representing a second 3D object, where the first mesh differs from the second mesh; determining one or more correspondence points on each of the first mesh and the second mesh; aligning the first mesh with the second mesh based on an alignment transformation, where the alignment transformation is determined based on the one or more correspondence points; determining one or more texture portions of the 2D texture associated with one or more corresponding portions of the first mesh; assigning the one or more texture portions of the 2D texture to one or more corresponding portions of the aligned second mesh; and for each particular texture portion of the one or more texture portions: projecting the particular texture portion onto a 2D plane related to a particular corresponding portion of the one or more corresponding portions of the aligned second mesh, and fitting the projected particular texture portion to the particular corresponding portion of the aligned second mesh.

It should be understood that the description provided in this summary section and elsewhere in this document is intended to illustrate aspects of the present disclosure by way of non-limiting example. Generally, the features, functions, components, and advantages that are discussed herein can be achieved independently in various embodiments or may be combined in yet other embodiments, further details of which are disclosed in the following description and the accompanying drawings.

DETAILED DESCRIPTION

Figure 1:
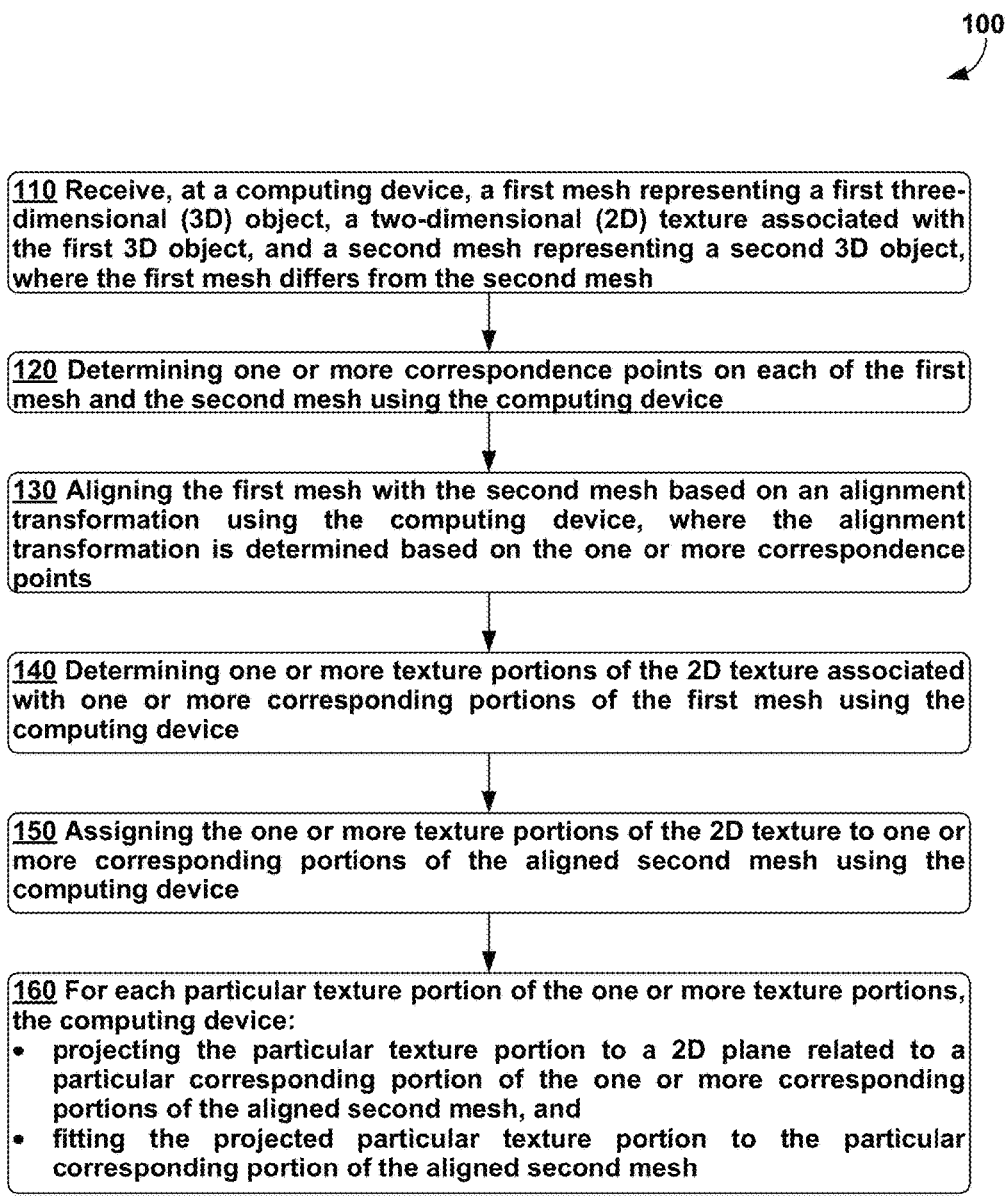
FIG. 1 is a flowchart of a method for fitting a 2D texture onto a 3D object, according to an example embodiment.

One or more 3D meshes can model part or all of one or more 3D objects, such as, but not limited to, one or more: mechanisms, non-mechanical objects, shapes, weather phenomena (e.g., clouds, fog banks) and/or animals. The 3D mesh(es) can be associated with one or more 2D textures that can be applied to the 3D mesh(es). For example, a 3D mesh of an airplane part can be associated with a 2D texture representing a paint or other coloration scheme to be applied to the airplane part; e.g., as part of an airline's livery, for camouflage. Then, during a design process for the airplane part, a computer-aided design (CAD) and/or one or more related systems can generate a 3D mesh representing the designed part and a corresponding 2D texture for a portion of the coloration scheme to be applied at least to the designed part.

A procedure for applying a 2D texture to a 3D mesh can involve "UV unwrapping" of the 3D mesh, or determining faces or surfaces of the 3D mesh that correspond to "texture islands" or distinct portions of the 2D texture. In some examples, one UV coordinate system is used for an entire texture, where the UV coordinate system is based on a U axis and a V axis, where the U axis is a horizontal axis for the texture, and the V axis is a vertical axis for the texture. In other examples, multiple UV coordinate systems can be used for one texture; e.g., a separate UV coordinate system is used for each texture island.

However, a UV unwrapping of a particular 3D mesh and corresponding application of a 2D texture to the unwrapped particular 3D mesh may only be valid for one particular 3D mesh. If another 3D mesh is created with a different topology, then the new 3D mesh may be manually UV unwrapped and the texture would have to be modified to fit the unwrapping. For example, suppose a first "as-designed" 3D mesh is a mesh representing an object as originally designed. Then, after the designed object is built, a 3D scan is taken of the built object that generates a second "as-built" 3D mesh representing the actual, built object. In this example, the as-designed 3D mesh is similar to the as-built 3D mesh.

Despite such similarities, a mapping or other information about applying a 2D texture to the as-designed 3D mesh may not be directly germane to applying the same 2D texture to the as-built 3D mesh. For example, 3D meshes are often made up of polygons, such as triangles or quadrilaterals. In some cases, as-designed 3D meshes have fewer polygons than as-built meshes, as some 3D scanning procedures can produce 3D meshes with a large number of polygons. In some cases, an as-built mesh may have a number NB of polygons that is one or more orders of magnitude larger than a number ND of polygons for a corresponding as-designed mesh. Having such a large difference in the number of polygons between the two similar meshes can increase the difficulty of fitting a texture for the as-designed mesh to fit the as-built mesh.

Herein are described techniques and apparatus for automatically UV unwrapping and modifying 2D textures to apply an existing 2D texture previously applicable to a first (e.g., as-designed) 3D mesh to a second, similarly-shaped (e.g., as-built) 3D mesh. These techniques and apparatus include transferring UV coordinates for the 2D texture from the first 3D mesh to the second 3D mesh using correspondence points between the two 3D meshes to accurately map the 2D texture on the second 3D mesh. In particular, the correspondence points can be used to map texture islands associated with (e.g., designed for) faces/surfaces the first 3D mesh onto corresponding faces/surfaces of the second 3D mesh.

For example, to UV unwrap and modify a 2D texture TEX1 previously applicable to an as-designed 3D mesh ADM for a 3D object O1 to an as-built 3D mesh ABM for the 3D object O1, a computing device can carry out the following technique:

1. The computing device creates a "UVIsland" data structure for the ADM mesh that maps portions of the ADM mesh to texture islands of TEX1. Each texture island referenced by the UVIsland data structure, which includes one or more (references to) collections of polygons, faces, and/or surfaces of the ADM mesh, where each polygon (or face or surface) in a collection shares both an edge (two or more vertices) and UV coordinates for texture TEX1 with another polygon (or face or surface) in the collection.

2. The computing device determines and uses one or more correspondence points CP1, CP2 . . . between the as-designed mesh ADM and the as-built mesh ABM to find a transformation matrix TM, where transformation matrix TM transforms ABM to align ABM with ADM as much as possible.

3. For each polygon (or face or surface) P1 of the as-built mesh ABM, the computing device determines a centroid of P1 and use the centroid of P1 to find a texture island in the UVIsland data structure that refers to or includes a polygon (or face or surface) of the as-designed mesh ADM P2 that most closely matches P1. Then, upon finding polygon P2 of as-designed mesh, P1 of ABM is assigned to the same texture island as assigned to P2 in the UVIsland data structure. To find P2, the computing device finds a closest polygon (or face or surface) in the as-designed mesh ADM to the centroid of P1 of the as-built mesh ABM.

4. As a result of mapping texture islands of the UVIsland data structure to polygons (or faces or surfaces) of the as-built mesh ABM, the computing device determines a data structure UVIslandABM, which that maps polygons (or faces or surfaces) of the as-built mesh ABM to the texture islands of TEX1 represented in the UVIsland data structure. Then, for each texture island TI1 in the UVIslandABM data structure, the computing device unwraps polygons (or faces or surfaces) of ABM mapping ABM_POLY_TI1 referred to in the UVIslandABM data structure for the island TI1 by treating edges of the island TI1 as seams. This unwrapping involves projecting the polygons (or faces or surfaces) ABM_POLY_TI1 onto a 2D plane representing TI1 while maintaining face proportionality so TI1 is not skewed. For example, a least-squares conformal mapping can be used to project the polygons (or faces or surfaces) ABM_POLY_TI1 onto the 2D plane representing TI1, thereby unwrapping the polygons (or faces or surfaces) ABM_POLY_TI1.

5. The computing device fits each projected texture island in the UVIslandABM data structure to the corresponding unwrapped polygons (or faces or surfaces) of ABM. To fit a texture island TI1 to corresponding unwrapped polygons (or faces or surfaces) ABM_POLY_TI1, the computing device can use correspondence points CP1, CP2 . . . determined at step 2 to determine a transformation matrix to scale, translate and rotate all polygons (or faces or surfaces) of ABM_POLY_TI1 proportionately to most closely match polygons (or faces or surfaces) in as-designed mesh ADM that related to texture island TI1 in the UVIsland data structure. For example, the computing device can determine barycentric coordinates of triangles (or other polygons) formed using groups of three (or more) correspondence points for each of the as-designed mesh ADM and the as-built mesh ABM to fit a 2D projection of TI1 to polygons (or faces or surfaces) of ABM_POLY_TI1 to a 2D projection of TI1 to corresponding polygons (or faces or surfaces) of ADM. In some examples, the computing device stores texture island TI1 as projected to ABM_POLY_TI1 so that the projection remains within the confines of corresponding polygons (or faces or surfaces) of ADM, while getting as close to the edges of TI1 as possible. In other examples, the computing device determines that the 2D projection of TI1 to polygons (or faces or surfaces) of ABM_POLY_TI1 is larger than the 2D projection of TI1 to corresponding polygons (or faces or surfaces) of ADM (or vice versa). Then, the 2D projection of TI1 to polygons (or faces or surfaces) of ABM_POLY_TI1 can be scaled down proportionately and rotated to more closely match correspondence points for the 3D mesh ADM.

In some examples, prior techniques of UV unwrapping and subsequently applying the 2D texture to the unwrapped 3D mesh were performed manually, which can be both tedious and error-prone. In contrast, the herein-described techniques and apparatus involve automatic UV unwrapping, reducing error and saving time, effort, expense during mapping of textures to new 3D meshes. Further, the herein-described techniques and apparatus can be applied to multiple new 3D meshes with substantially less (or no) human effort (e.g., to specify correspondence points between meshes) and substantially more data reuse, as opposed to prior techniques which involved UV unwrapping one mesh at time. This aspect is particularly beneficial in a production environment, where one as-designed object and corresponding texture can be used for UV unwrapping for multiple 3D meshes corresponding to multiple as-built objects.

FIG. 1 is a flowchart of a method 100 for fitting a 2D texture onto a 3D object, according to an example embodiment. Method 100 is executable by a computing device, such as computing device 200 described below in the context of FIG. 2.

Method 100 begins at block 110 of FIG. 1, where the computing device receives a first mesh representing a first three-dimensional (3D) object, a two-dimensional (2D) texture associated with the first 3D object, and a second mesh representing a second 3D object, where the first mesh differs from the second mesh, such as discussed in the context of at least FIGS. 3-6.

Figure 3:
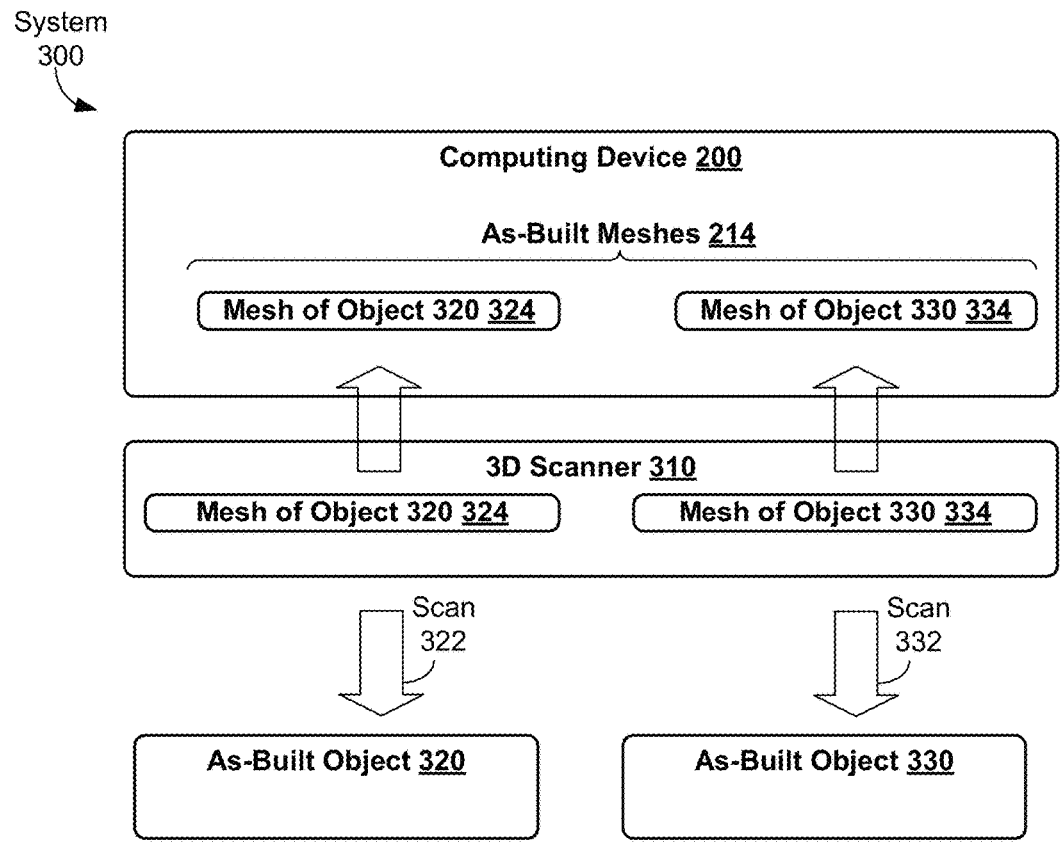
FIG. 3 is a block diagram of a system, according to an example embodiment.
Figure 4:
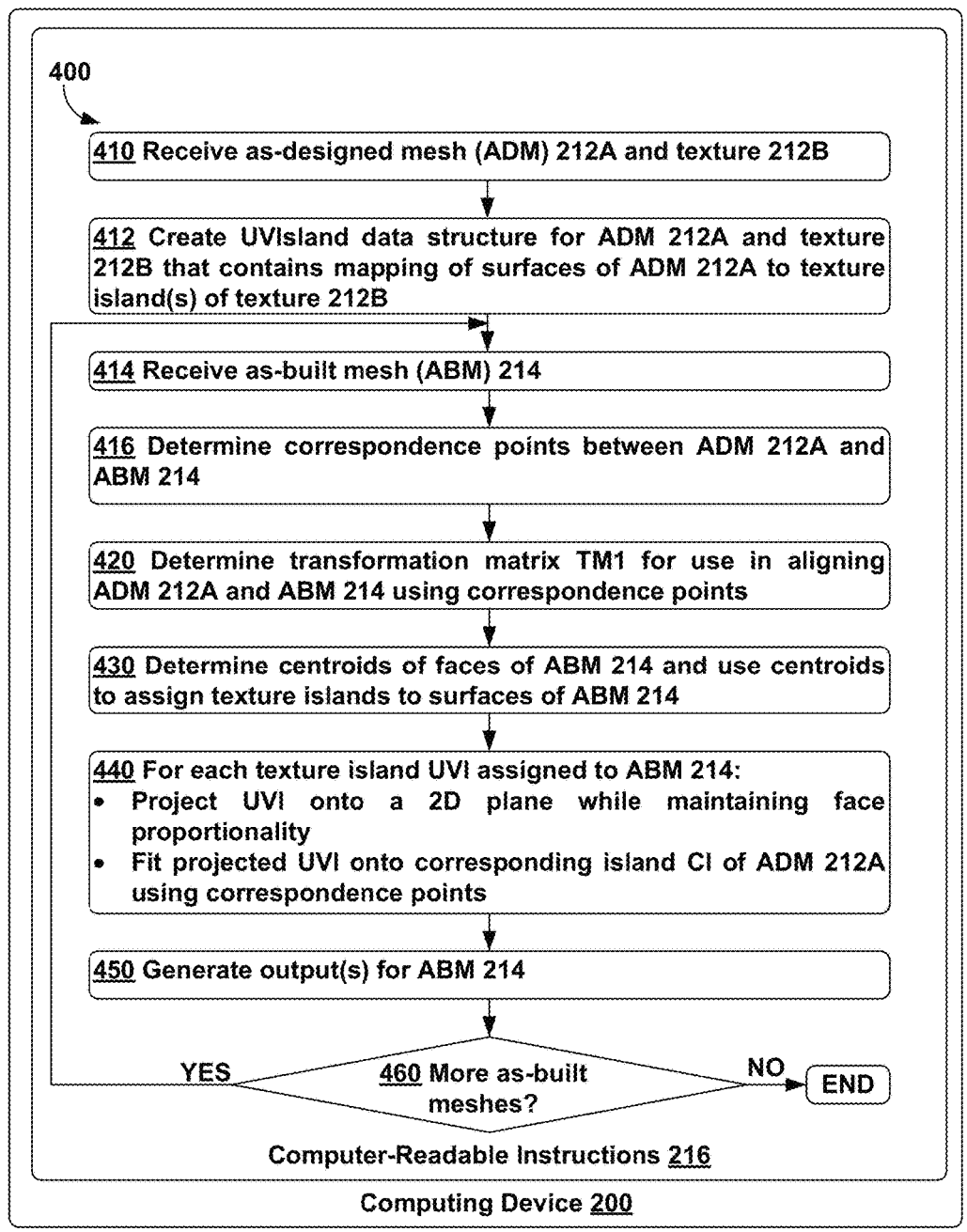
FIG. 4 is a flowchart of a method for fitting a 2D texture onto a 3D object executable by the computing device of FIG. 2, according to an example embodiment.
Figure 5:
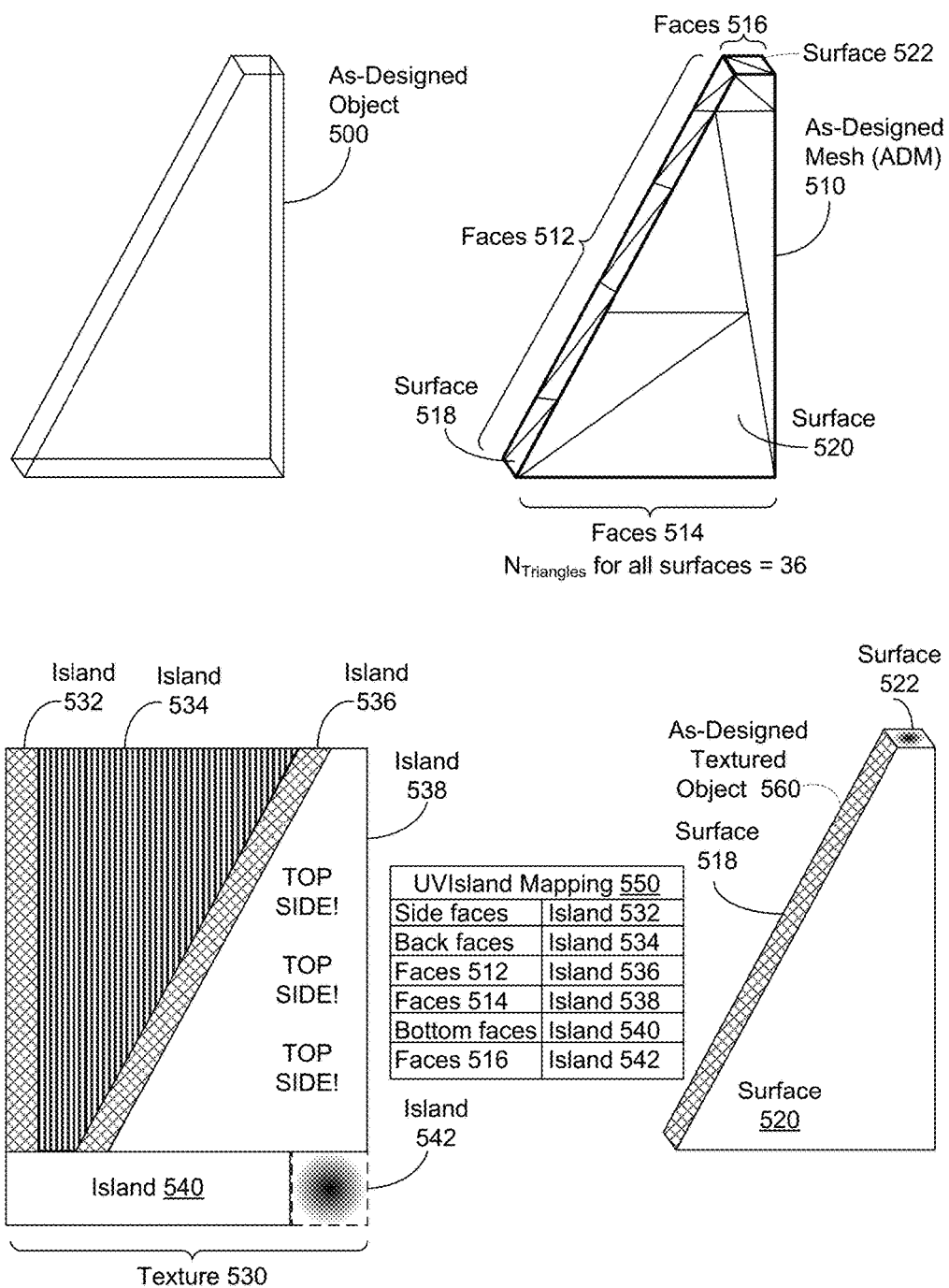
FIG. 5 shows an as-designed object, an as-designed mesh (ADM) representing the as-designed object, a texture, a mapping of faces of the as-designed mesh to texture islands of the texture, and the as-designed object with the texture applied, according to an example embodiment.
Figure 6:
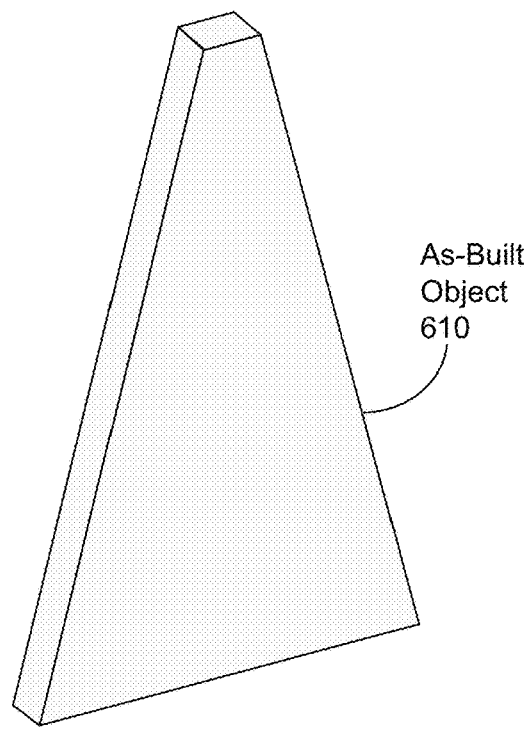
FIG. 6 shows an as-built object and an as-built mesh (ABM) representing the as-built object, according to an example embodiment.
Figure 6:
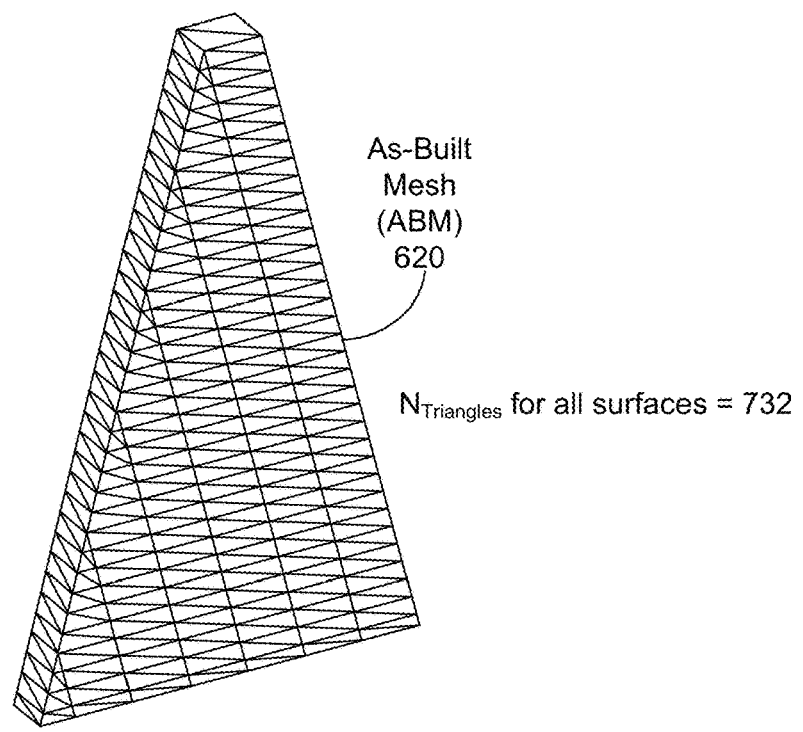

In some examples, receiving the second mesh includes receiving a scan of the second 3D object, where the second 3D object includes an object built based on a design represented by the first mesh, such as discussed in the context of at least FIGS. 3, 4, and 6. In other examples, receiving the first mesh includes receiving a first mesh having a first number of polygons, and receiving the second mesh includes receiving a second mesh having a second number of polygons; then, the second number can be at least an order of magnitude larger than the first number of polygons, such as discussed in the context of at least FIGS. 5 and 6.

Figure 7:
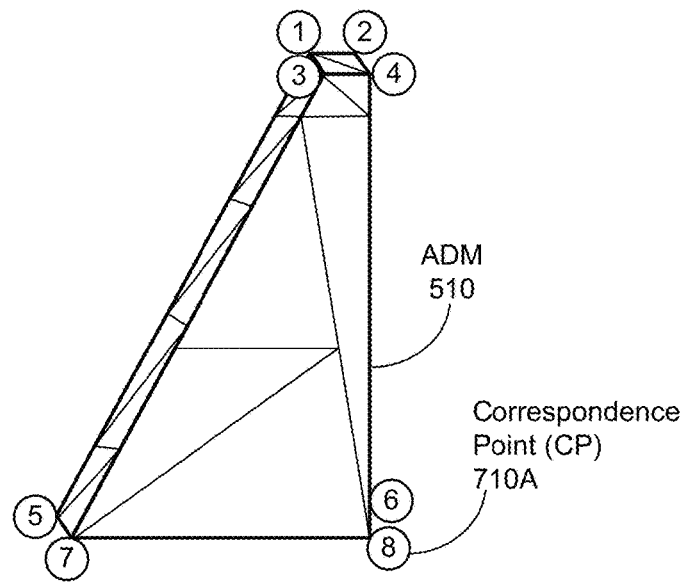
FIG. 7 shows as-designed correspondence points (CPs) on the as-designed mesh, as-built correspondence points on the as-built mesh that correspond to the as-designed correspondence points, and an as-built mesh that has been aligned with the as-designed mesh, according to an example embodiment.
Figure 7:
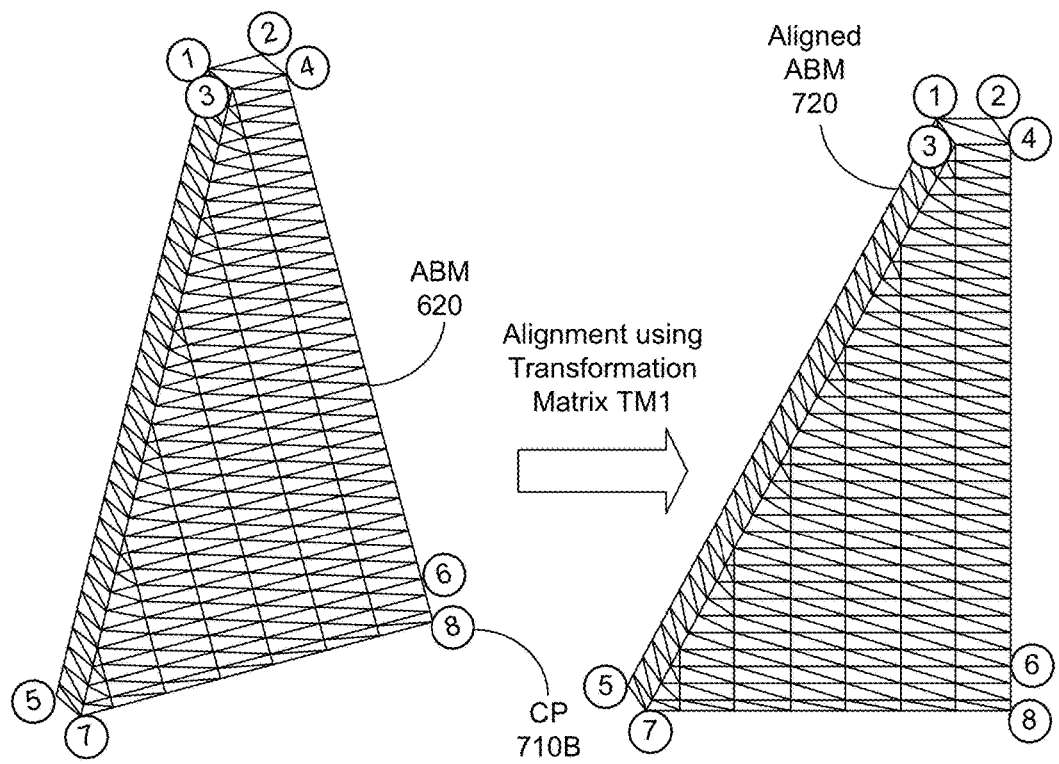
Figure 8:
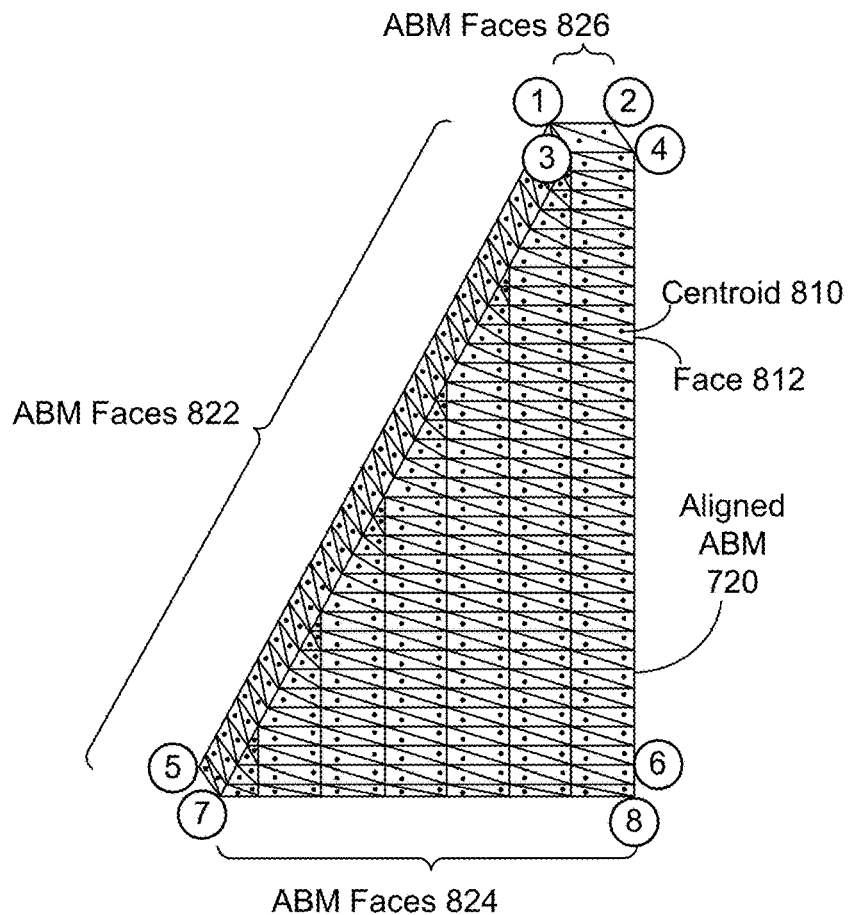
FIG. 8 shows centroids of polygons of the aligned as-built mesh of FIG. 7 and a mapping of faces of the as-built mesh to texture islands of the texture, according to an example embodiment.

At block 120, the computing device determines one or more correspondence points on each of the first mesh and the second mesh, such as discussed in the context of at least FIGS. 4, 7, and 8. In some examples, determining one or more correspondence points on each of the first mesh and the second mesh includes determining at least three correspondence points for each texture portion of the one or more texture portions, such as discussed in the context of at least FIGS. 4, 7, and 8. In some particular of these examples, fitting the projected particular texture portion to the particular corresponding portion of the aligned second mesh includes: determining one or more barycentric coordinates for a particular texture portion based on the at least three correspondence points for the particular texture portion; and fitting the projected particular texture portion to the particular corresponding portion of the aligned second mesh based on the one or more barycentric coordinates, such as discussed in the context of at least FIGS. 4 and 8. In other particular of these examples, fitting the projected particular texture portion to the particular corresponding portion of the aligned second mesh includes: determining a polygon of the second mesh that is adjacent to the particular corresponding portion of the aligned second mesh and is unassociated with the one or more texture portions; and further assigning the projected particular texture portion to the polygon of the second mesh, such as discussed in the context of at least FIG. 4.

At block 130, the computing device aligns the first mesh with the second mesh based on an alignment transformation, where the alignment transformation is determined based on the one or more correspondence points, such as discussed in the context of at least FIGS. 4 and 7.

At block 140, the computing device determines one or more texture portions of the 2D texture associated with one or more corresponding portions of the first mesh, such as discussed in the context of at least FIGS. 4 and 5. In some examples, the first mesh includes a first plurality of faces; then determining the one or more texture portions of the 2D texture associated with the one or more corresponding portions of the first mesh includes determining a mapping of the one or more texture portions to one or more faces of the first plurality of faces, such as discussed in the context of at least FIGS. 4 and 5.

At block 150, the computing device assigns the one or more texture portions of the 2D texture to one or more corresponding portions of the aligned second mesh, such as discussed in the context of at least FIGS. 4 and 8. In some examples, the second mesh includes a second plurality of faces; then, assigning the one or more texture portions of the 2D texture to one or more corresponding portions of the aligned second mesh includes: determining a centroid of a second face of the second plurality of faces that is aligned with a first face of the first mesh; and assigning a second texture portion to the second face based on the centroid of the second face, such as discussed in the context of at least FIGS. 4 and 8.

Figure 9:
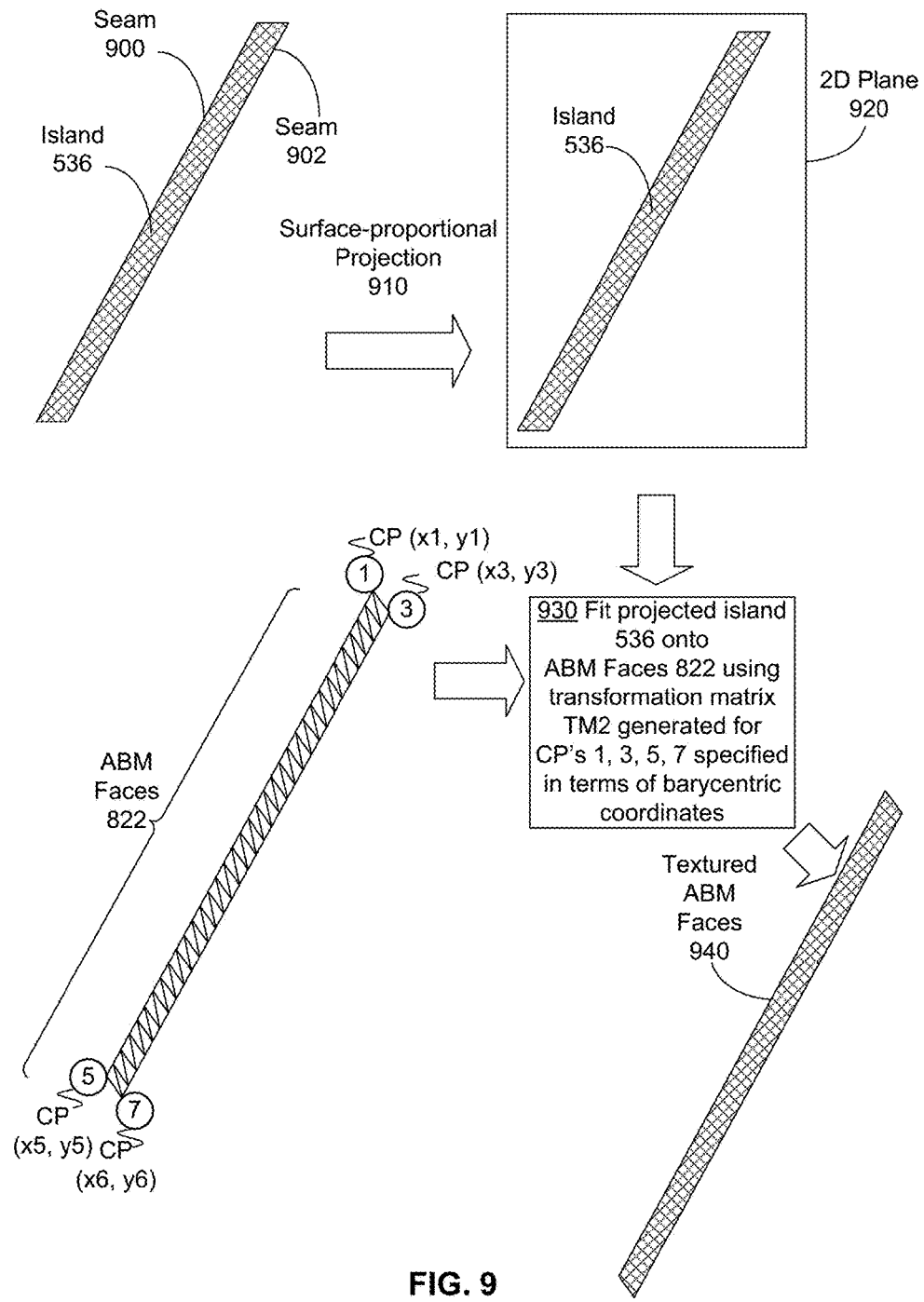
FIG. 9 illustrates a technique of fitting a texture island onto a face of the as-built mesh, according to an example embodiment.

At block 160, for each particular texture portion of the one or more texture portions, the computing device: projects the particular texture portion onto a 2D plane related to a particular corresponding portion of the one or more corresponding portions of the aligned second mesh, and fits the projected particular texture portion to the particular corresponding portion of the aligned second mesh, such as discussed in the context of at least FIGS. 4 and 9.

In some examples, the 2D plane related to the particular corresponding portion of the aligned second mesh includes a 2D plane representing a surface of the first mesh; then, projecting the particular texture portion onto the 2D plane related to the particular corresponding portion of the aligned second mesh includes projecting the particular texture portion onto the 2D plane while maintaining one or more proportions of the surface of the first mesh, such as discussed in the context of at least FIGS. 4 and 9. In particular of these examples, projecting the particular texture portion onto the 2D plane while maintaining one or more proportions of the surface of the first mesh includes projecting the particular texture portion onto the 2D plane while maintaining one or more proportions of the surface of the first mesh using a conformal mapping, such as discussed in the context of at least FIGS. 4 and 9.

In other examples, fitting the projected particular texture portion to the particular corresponding portion of the aligned second mesh includes performing a transform of the particular texture portion to fit the particular corresponding portion of the aligned second mesh, where the transform of the particular texture portion includes one or more of: a rotation of the particular texture portion, a scale of the particular texture portion, and a skew of the particular texture portion, such as discussed in the context of at least FIGS. 4 and 9.

Figure 10:
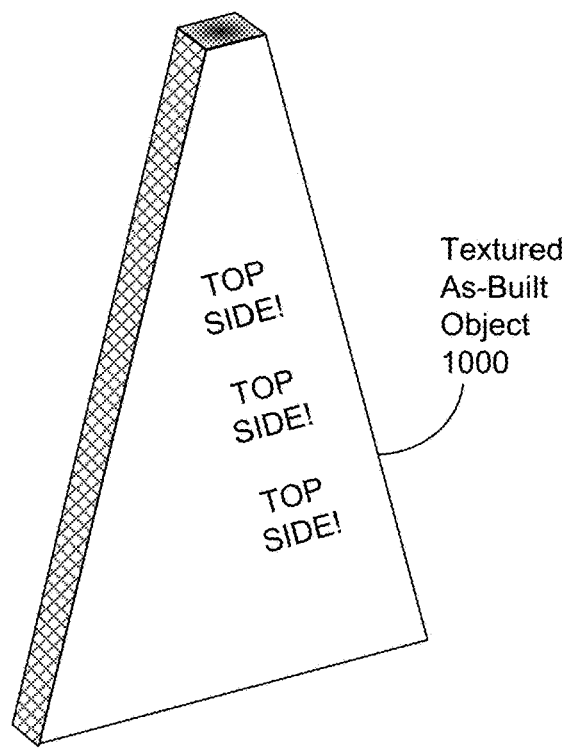
FIG. 10 depicts the as-built object with the texture applied and a related image, according to an example embodiment.
Figure 10:
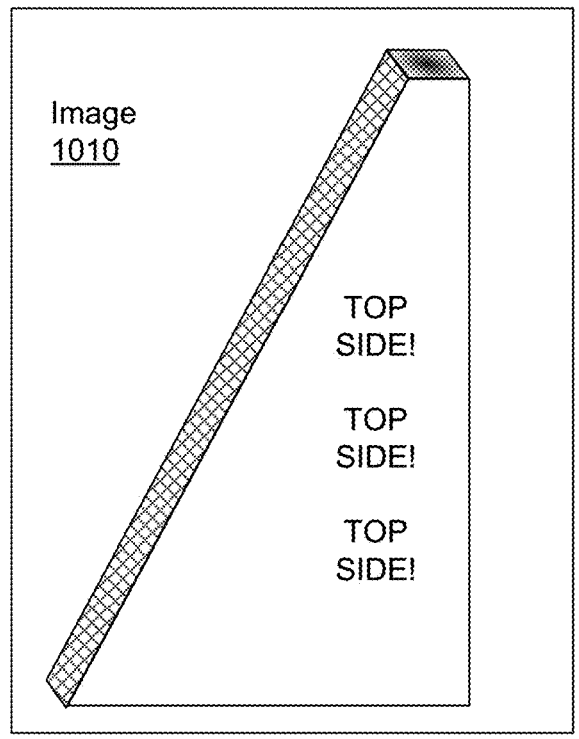

In some examples, method 100 further includes: generating an output of the computing device, the output based on the one or more fitted texture portions, such as discussed below at least the context of FIGS. 4 and 10. In particular of these examples, generating the output includes generating at least one of: one or more instructions to apply a texture to the second 3D object in accord with the one or more fitted texture portions, and an image of at least a part of the second 3D object covered by a part of the texture that corresponds to at least part of one or more fitted texture portions, such as discussed below at least the context of FIGS. 4 and 10.

In other examples, method 100 further includes: receiving, at the computing device, a third mesh representing a third 3D object, where the third mesh is based on a scan of the third 3D object, and where the third 3D object differs from the first 3D object and the second 3D object; determining one or more third correspondence points on each of the first mesh and the third mesh using the computing device; aligning the first mesh with the third mesh based on a third alignment transformation using the computing device, where the third alignment transformation is determined based on the one or more third correspondence points; assigning the one or more texture portions of the 2D texture to one or more third corresponding portions of the aligned third mesh using the computing device; for each particular texture portion of the one or more texture portions, the computing device: projecting the particular texture portion onto a 2D plane related to a particular corresponding third portion of the one or more third corresponding portions of the aligned third mesh, and fitting the projected particular texture portion to the particular corresponding third portion of the aligned third mesh, such as discussed at least in the context of FIG. 4.

In some examples, the computing device is part of a system that includes a 3D scanner; then, receiving the first mesh, the 2D texture, and the second mesh includes: generating the second mesh by using the 3D scanner to scan the second 3D object; and receiving the second mesh at the computing device from the 3D scanner, such as discussed above at least in the context of FIG. 3.

Figure 2:
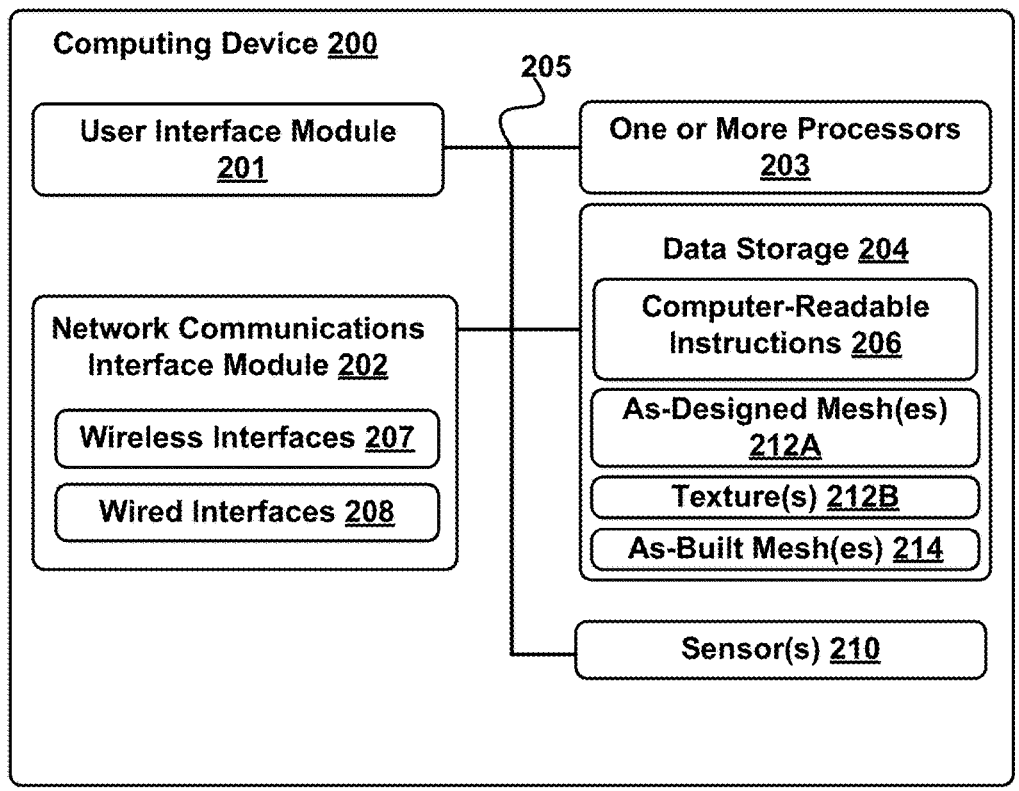
FIG. 2 is a block diagram of a computing device, according to an example embodiment.

FIG. 2 is a block diagram of computing device 200, according to an example embodiment. Computing device 200 includes user interface module 201 (e.g., user interface), network-communication interface module 202, one or more processors 203, data storage 204, and sensor(s) 210, all of which may be linked together via a system bus, network, or other connection mechanism 205, in accordance with an example embodiment. In particular, computing device 200 can perform some or all of the herein-described functionality related to one or more of: methods 100, 400, 3D scanner 310, an as-built mesh, an as-designed mesh, a UVIsland mapping, a UVIslandABM mapping, a texture, a textured object, a transformation matrix, a seam, a barycentric coordinate, and/or an image. In some embodiments, computing device 200 can be a mobile or non-mobile computing device, and can be embodied as one or more of: desktop computer, laptop or notebook computer, personal data assistant (PDA), mobile phone, smart phone, smart watch, embedded processor, and/or any similar device that is equipped with at least one processing unit capable of executing machine-language instructions that implement at least part of the herein-described techniques and methods.

User interface 201 can receive input and/or provide output, perhaps to a user. User interface 201 can be configured to send and/or receive data to and/or from user input from input device(s), such as a keyboard, a keypad, a touch screen, a touch pad, a computer mouse, a track ball, a joystick, a game controller, and/or other similar devices configured to receive user input from a user of the computing device 200. User interface 201 includes output display devices, which includes, but are not limited to, one or more: cathode ray tubes (CRTs), liquid crystal displays (LCDs), light emitting diodes (LEDs), displays using digital light processing (DLP) technology, printers, light bulbs, and/or other devices capable of displaying visual outputs (e.g., graphical, textual, and/or numerical information). User interface 201 can also be configured with one or more devices to generate audible output(s), such as a speaker, speaker jack, audio output port, audio output device, earphones, and/or other similar devices configured to convey sound and/or audible information to a user of computing device 200.

Network-communication interface module 202 can be configured to send and receive data over wireless interfaces 207 and/or wired interfaces 208 via a data or other communications network. Wireless interface(s) 207 if present, can utilize an air interface, such as a Bluetooth®, ZigBee®, Wi-Fi™, and/or WiMAX™ interface to a data network, such as a wide area network (WAN), a local area network (LAN), one or more public data networks (e.g., the Internet), one or more private data networks, or any combination of public and private data networks. Wired interface(s) 208, if present, can comprise a wire, cable, fiber-optic link and/or similar physical connection to a data network, such as a WAN, a LAN, one or more public data networks, such as the Internet, one or more private data networks, or any combination of such networks.

In some embodiments, network-communication interface module 202 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well as or in addition to those listed herein to secure (and then decrypt/decode) communications.

Processor(s) 203 includes one or more central processing units, computer processors, mobile processors, digital signal processors (DSPs), GPUs, microprocessors, computer chips, programmable processors, multi-core processors, and/or other processing units configured to execute machine-language instructions and process data. Processor(s) 203 can be configured to execute computer-readable program instructions 206 that are contained in data storage 204 and/or other instructions as described herein.

Data storage 204 includes one or more physical and/or non-transitory storage devices, such as read-only memory (ROM), random access memory (RAM), removable disk drives, hard drives, thumb drives, magnetic-tape memory, optical-disk memory, flash memory, volatile storage devices, non-volatile storage devices, and/or other storage devices. Generally, a storage device is hardware that is capable of storing information; for example, data, computer-readable program instructions, and/or other suitable information on a temporary basis and/or a permanent basis. Data storage 204 can include one or more physical and/or non-transitory storage devices with at least enough combined storage capacity to contain computer-readable program instructions 206 and any associated/related data structures. In some embodiments, some or all of data storage 204 can be removable, such as a removable hard drive, removable disk, or flash memory.

Computer-readable program instructions 206 and any data structures contained in data storage 204 include computer-readable program instructions executable by processor(s) 203 and any storage required, respectively, to perform at least part of the herein-described functionality of a computing device. For example, data storage 204 can also store one or more as-designed meshes 212A, one or more textures 212B, one or more as-built meshes 214, and/or other data structures used to perform at least part of the herein-described functionality of a computing device. Computer-readable program instructions 206 can include instructions that when executed by processor(s) 203 to perform functions, including but not limited to herein-described functionality of software, displays, and/or user interfaces.

In some embodiments, computing device 200 includes one or more sensors 210. Sensor(s) 210 can be configured to measure conditions in an environment around computing device 200 and provide data about the measured conditions of the environment. The data can include, but are not limited to, location data about computing device 200 (including, but not limited to, latitude, longitude, and/or altitude data), kinematic information related to computing device 200 (e.g., speed, velocity, acceleration data), and other data about the environment around computing device 200, meteorological data about the environment (e.g., air temperature, humidity, barometric pressure, wind speed), and electromagnetic radiation data (e.g., infra-red, ultra-violet, X-ray data). The one or more sensors 210 can include, but are not limited to, one or more: Global Positioning System (GPS) sensors, location sensors, gyroscopes, accelerometers, magnetometers, video and/or still cameras, light sensors, infrared sensors, ultraviolet sensors, X-ray sensors, meteorological sensors, proximity sensors, vibration and/or motion sensors, heat sensors, thermometers, lasers, and microphones. Other examples of sensor(s) 210 are possible as well.

Other components shown in FIG. 2 can be varied from the illustrative examples shown. Generally, the different embodiments can be implemented using any hardware device or system capable of running program code.

FIG. 3 is a block diagram of system 300, according to an example embodiment. System 300 includes computing device 200, 3D scanner 310, and as-built objects 320, 330. In other examples, system 300 includes more, fewer, and/or different objects that as-built objects 320, 330. Computing device 200 is shown storing one or more as-built meshes 214 that include 3D meshes 324, 334, where 3D mesh 324 includes a 3D mesh representing as-built object 320, and 3D mesh 334 includes a 3D mesh representing as-built object 330. In other examples, computing device 200 includes more, fewer, and/or different meshes than as-built meshes 214.

3D scanner 310 is a device that that can be activated to generate a 3D mesh that represents a 3D object by collecting data on one or more shapes, colors, appearances, and perhaps other features of the 3D object. The collected data about the 3D object can be represented as one or more of: a point cloud and a mesh of faces, surfaces, and/or polygons. In the example shown in FIG. 3, 3D scanner can be activated to perform respective scans 322, 332 of respective as-built objects 320, 330 to generate respective meshes 324, 334. Some or all of meshes 324, 334 can be stored in a memory of 3D scanner 310 and/or transmitted by 3D scanner 310 to computing device 200. In some examples, software and/or hardware of 3D scanner 310 and/or computing device 200 can be used to generate a mesh of faces, surfaces, and/or polygons representing the 3D object from another data structure; e.g., a point cloud.

FIG. 4 is a flowchart of method 400 for fitting a 2D texture onto a 3D object, where method 400 is executable by a computing device, such as computing device 200, according to an example embodiment. For example, FIG. 5 shows, at upper left, 3D as-designed object 500, and at lower left, texture 530. Texture 530 is shown as including six texture islands 532, 534, 536, 538, 540, and 542.

FIG. 4 indicates that method 400 begins at block 410, where computing device 200 receives an as-designed mesh as as-designed mesh 212A and a texture as texture 212B.

At block 412, computing device 200 creates a UVIsland data structure for as-designed mesh 212A and texture 212B that contains a mapping of (sets of) faces of as-designed mesh 212A to one or more texture islands of texture 212B. For example, at upper right of FIG. 5 shows an as-designed mesh as as-designed mesh 510 that includes three visible surfaces 518, 520, and 522 that are made up on respective sets of faces 512, 514, 516, where each face of all of faces 512, 514, 516 is a triangle. Not shown in FIG. 5 are three surfaces—a side surface that borders each of surfaces 520 and 522 and includes ten side faces, a back surface that borders each of surfaces 518 and 522 and includes six back faces, and a bottom surface that borders each of surfaces 518 and 520 and includes two bottom faces. Then, as-designed mesh includes 36 faces, as indicated by number of faces/a number of triangles $N_{Triangles}$ being equal to 36.

At lower center of FIG. 5, UVIsland mapping 550 is presented, which is an example of the UVIsland data structure. For example, UVIsland mapping 550 indicates that "Faces 512" of surface 518 relate to texture island 536 of texture 530, where both surface 518 and texture island 536 have a shape of a diagonal strip. UVIsland mapping 550 also indicates that: "Faces 514" of surface 520 relate to texture island 538 that includes the words "TOP SIDE!" repeated three times, and that "Faces 516" of surface 522 relate to texture island 542, which shows a shaded disk. UVIsland mapping 550 further indicates that respective not-visible "Side faces", "Back faces" and "Bottom faces" relate to respective texture islands 532, 534, and 540 of texture 530.

By using UVIsland mapping 550, islands of texture 530 can be applied as textures to respective faces of as-designed mapping. At lower right of FIG. 5, an example of a "textured" 3D object—that is, an object that has had a texture applied—is shown as as-designed textured object 560, where texture island 536 is shown superimposed onto faces 512/surface 518, texture island 538 is shown superimposed onto faces 514/surface 520, and texture island 542 is shown superimposed onto faces 516/surface 522.

FIG. 4 shows that, at block 414, computing device 200 receives an as-built mesh as as-built mesh 214. An example as-built mesh is shown as as-built mesh 620 at a lower portion FIG. 6, where as-built mesh 620 is a representation, such as a result of a 3D scan, of as-built object 610. In the example shown in FIG. 6, as-built mesh includes 732 faces, each of which is a triangle, as indicated by number of faces/a number of triangles $N_{Triangles}$ being equal to 732. Then, to compare as-designed mesh 510 and as-built mesh 620, a ratio of ($N_{Triangles}$ for as-built mesh 620) to ($N_{Triangles}$ for as-designed mesh 510)=732/36≈20.33. In this example, the number of faces in as-built mesh 620 is more than an order of magnitude larger than the number of faces in as-designed mesh 510. In fact, as-built mesh 620 has more than 20 times the number of faces than in as-designed mesh 510.

At block 416 of method 400 illustrated in FIG. 4, computing device 200 determines correspondence points between as-designed mesh 212A and as-built mesh 214. In some examples, some or all of the correspondence points between as-designed mesh 212A and as-built mesh 214 are determined using automated techniques; e.g., one or more registration techniques for 3D points suitable for determining rotations, translations, and/or other correspondences between one or more points of as-designed mesh 212A and one or more points of as-built mesh 214. In other examples, some or all of the correspondence points between as-designed mesh 212A and as-built mesh 214 are determined based on inputs, such as inputs received from a user of computing device 200 indicating correlations/correspondence between points, faces, and/or surfaces of as-designed mesh 212A and as-built mesh 214.

An upper portion of FIG. 7 shows as-designed mesh 510 with eight correspondence points, indicated with circles numbered from 1 to 8, where correspondence point #8 for as-designed mesh 510 is labeled as correspondence point 710A. A related set of eight correspondence points is shown at lower-left of FIG. 7 on as-built mesh 620, where the eight correspondence points for as-built mesh 620 are also indicated with circles numbered from 1 to 8, where correspondence point #8 for as-built mesh 620 is labeled as correspondence point 710B.

FIG. 7 illustrates the correspondences indicated by selected correspondence points #1-#8. More particularly, FIG. 7 shows that: correspondence point #1 is at an upper-left corner of a top-most surface for both as-designed mesh 510 and as-built mesh 620, correspondence point #2 is at an upper-right corner of the top-most surface for both as-designed mesh 510 and as-built mesh 620, correspondence point #3 is at an lower-left corner of the top-most surface for both as-designed mesh 510 and as-built mesh 620, and correspondence point #4 is at an lower-right corner of the top-most surface for both as-designed mesh 510 and as-built mesh 620. FIG. 7 also shows that: correspondence point #5 is at an upper-left corner of a bottom-most surface for both as-designed mesh 510 and as-built mesh 620, correspondence point #6 is at an upper-right corner of the bottom-most surface for both as-designed mesh 510 and as-built mesh 620, correspondence point #7 is at an lower-left corner of the bottom-most surface for both as-designed mesh 510 and as-built mesh 620, and correspondence point #8 is at an lower-right corner of the bottom-most surface for both as-designed mesh 510 and as-built mesh 620.

As such, a selection of the eight correspondence points of either as-designed mesh 510 or as-built mesh 620 can identify each of the six surfaces of either as-designed mesh 510 or as-built mesh 620; e.g., the top-most surface of either as-designed mesh 510 (shown as surface 522 in FIG. 5) or as-built mesh 620 can be identified as the surface associated with correspondence points #1, #2, #3, and #4, a front surface of either as-designed mesh 510 (shown as surface 520 in FIG. 5) or as-built mesh 620 can be identified as the surface associated with correspondence points #3, #4, #7, and #8, a left-side surface of either as-designed mesh 510 (shown as surface 518 in FIG. 5) or as-built mesh 620 can be identified as the surface associated with correspondence points #1, #3, #5, and #7.

At block 420 of method 400 illustrated in FIG. 4, computing device 200 determines transformation matrix TM1 for use in aligning as-designed mesh 212A and as-built mesh 214, where TM1 is determined using the correspondence points determined at block 416. For example, transformation matrix TM1 can embody one or more affine transformations (e.g., rotations, scaling, translations, reflections, shears) and perhaps one or more other non-affine transformations of correspondence points for as-built mesh 214 that move the correspondence points for as-built mesh 214 to be in line with the related correspondence points for as-designed mesh 212A. Then, once transformation matrix TM1 is determined, each point in as-built mesh 214 can be transformed by transformation matrix TM1 to align as-built mesh 214 and as-designed mesh 212A.

An example transformation of as-built mesh 214 involving a rotation embodied in transformation matrix TM1 is illustrated in FIG. 7. In particular, FIG. 7 shows a transformation as-built mesh 214 from a position as shown at lower left to the position shown at lower right. In the position shown at lower right of FIG. 7, aligned as-built mesh 720 depicts as-built mesh 620 after being aligned with as-designed mesh 510 in a position shown in an upper portion of FIG. 7, where the alignment of as-designed mesh 510 with as-built mesh 620 is performed using transformation matrix TM1.

At block 430 of method 400 illustrated in FIG. 4, computing device 200 determines centroids of faces of as-built mesh 214 and uses those centroids to assign texture islands to surfaces of as-built mesh 214. An upper portion of FIG. 8 shows aligned as-built mesh 720 after alignment with as-designed mesh 510 and after computing device 200 has determined a centroid for each face (triangle) of aligned as-built mesh 720, where a centroid of a face/triangle is shown using a black dot in the face/triangle. For example, an upper portion of FIG. 8 shows that aligned as-built mesh 720 is made up of faces, including ABM faces 822 making up an upper portion of aligned as-built mesh 720, ABM faces 824 making up a front portion of aligned as-built mesh 720, and ABM faces 826 making up an sloping side portion of aligned as-built mesh 720. FIG. 8 also shows each face of aligned as-built mesh 720 with a corresponding centroid; e.g., ABM faces 824 include face 812 whose centroid 810 is illustrated using a black dot. Then, the centroids of each face are combined to determine a centroid of a surface (or face or polygon) of as-built mesh 214 that would correspond to a surface (or face or polygon) of as-designed mesh 212A associated with a texture island listed in the UVIsland data structure. As an example of combining centroids, an area weighted average of X (or Y or Z) coordinates of each centroid of each face of ABM faces 824 can be determined to determine an X (or Y or Z) coordinate of the centroid a surface formed by ABM faces 824. A similar technique can be used to determine coordinates of other surfaces of an as-built mesh.

In other examples, a centroid for each of one or more surfaces of as-built mesh 214 that are formed by three or more correspondence points is determined. Then, the surface(s) of as-built mesh 214 whose centroids have been calculated should correspond to a surface (or face or polygon) of as-designed mesh 212A associated with a texture island listed in the UVIsland data structure.

Then, each face, polygon, or surface centroid of aligned as-built mesh 720 is compared to each centroid of a surface (or face or polygon) of as-designed mesh 212A associated with a texture island listed in the UVIsland data structure. Computing device 200 determines a centroid C1 of aligned as-built mesh 720 that comes the closest to the centroid C2 of a surface (or face or polygon) of as-designed mesh 212A associated with a texture island TI listed in the UVIsland data structure. Then, the surface (or face or polygon) of as-built mesh whose centroid is C1 is assigned to texture island TI in a UVIslandABM data structure. The UVIslandABM data structure for as-built mesh 214 and texture 212B maps of (sets of) faces of as-built mesh 214 one or more texture islands of texture 212B.

Computing device 200 continues the process of comparing centroids of aligned as-built mesh 720 to centroids of as-designed mesh 212A to assign texture islands to surfaces (or faces or polygons) until all texture islands listed in UVIsland data structure have been assigned to surfaces (or faces or polygons) of as-designed mesh 212A.

For example, computing device 200 can determine a centroid C_T of a surface of aligned as-built mesh 720 that is formed by correspondence points #3, #4, #7, and #8 by combining centroids of ABM faces 824 as illustrated at an upper portion of FIG. 8. Then, computing device 200 can compare centroid C_T to the respective centroids of the "Side faces", "Back faces", "Faces 512", "Faces 514", "Bottom faces", and "Faces 516" of as-designed mesh 510 listed in UVIsland mapping 550 to determine a respective centroid associated with as-designed mesh 510 that is closest to centroid C_T. In this example, centroid C_T of ABM faces 824 of aligned as-built mesh 720 is closest to the centroid of faces 514 of as-designed mesh 510. UVIsland mapping 550 of FIG. 5 indicates that texture "Island 538" is assigned to "Faces 514" of as-designed mesh 510. Then, computing device 200 can assign texture "Island 538" to "ABM Faces 824" of aligned as-built mesh 720 in UVIslandABM mapping 830, as shown in a lower portion of FIG. 8.

Similarly, a centroid of each of "ABM Side faces", "ABM Back Faces", "ABM Faces 822", "ABM Bottom faces" and "ABM Faces 826" of aligned as-built mesh 720 is determined by computing device 200, and each respective centroid is compared to respective centroids of as-designed mesh to enable computing device 200 to generate UVIslandABM mapping 830.

UVIslandABM mapping 830, shown in lower portion of FIG. 8, is an example of the UVIslandABM data structure showing a mapping between one or more faces of as-built mesh 620 (or aligned as-built mesh 720) to one or more texture islands of texture 530. In particular, UVIslandABM mapping 830 maps/associates sets of faces of aligned as-built mesh 720 (or, in other examples, sets of faces of as-built mesh 620 in other examples) respectively shown in FIG. 8 as "ABM Side faces", "ABM Back Faces", "ABM Faces 822", "ABM Bottom faces" and "ABM Faces 826" to respective texture islands "Island 532", "Island 534", "Island 536", "Island 538", "Island 540", and "Island 542".

At block 440 of method 400 illustrated in FIG. 4, computing device 200 processes each texture island assigned to as-built mesh 214. For example, computing device 200 can iterate/loop through each texture island of a UVIslandABM mapping determined at block 430, such as UVIslandABM mapping 830.

Block 440 indicates that, computing device 200 performs the following for each island UVI assigned to as-built mesh 214: (1) texture island UVI is projected onto a 2D plane representing the surfaces (or faces or polygons) associated with UVI in the UVIslandABM mapping while maintaining face proportionality and (2) projected texture island UVI is fit onto a corresponding texture island CI of as-designed mesh 212A using the correspondence points determined at block 416. Computing device 200 can consider edges of texture island UVI as seams between portions of texture islands in a texture, such as edges of texture island 536 of FIG. 5. FIG. 9 shows, at upper left, texture island 536 with seams 900 and 902 corresponding to edges of texture island 536 within texture 530.

To project texture island UVI onto a 2D plane PL1 while maintaining face proportionality, computing device 200 can project UVI onto 2D plane PL1 representing the surfaces (or faces or polygons) associated with UVI in the UVIslandABM data structure, thereby unwrapping the surfaces (or faces or polygons) associated with UVI in the UVIslandABM data structure. For example, computing device 200 can use a surface-proportional mapping, such as a least-squares conformal mapping, to project UVI onto 2D plane PL1, where the least-squares conformal mapping maintains face proportionality. FIG. 9 shows at upper right that surface-proportional projection 910 is used to project texture island 536 onto 2D plane 920.

To fit the 2D plane PL1 onto a corresponding texture island CI of as-designed mesh 212A, computing device 200 can determine barycentric coordinates the surfaces (or faces or polygons) associated with 2D plane PL1 and as-designed mesh 212A. For example, plane PL1 represents surfaces (or faces or polygons) associated with UVI in the UVIslandABM data structure. Then, at least three correspondence points CPA, CPB . . . CPC for the surfaces (or faces or polygons) associated with UVI in the UVIslandABM data structure can be selected by computing device 200. FIG. 8 shows that UVIslandABM Mapping 830 associates texture island 536 with ABM Faces 822. Then, in the example shown at lower left of FIG. 9, a surface represented by ABM Faces 822 is associated with four correspondence points: correspondence points #1, #3, #5, and #7.

Computing device 200 can determine barycentric coordinates for each triangle formed by three of the correspondence points CPA, CPB . . . CPC as they reside on each of as-built mesh 214 and as-designed mesh 212A. Using the barycentric coordinates of each of meshes 212A and 214, computing device can determine a transformation matrix TM2 to scale, translate and/or rotate texture island UVI associated with the as-built mesh 214 to most closely match corresponding island CI associated with the as-designed mesh 212A, where TM2 is selected to transform locations of correspondence points specified using barycentric coordinates associated with as-built mesh 214 to locations of correspondence points specified using barycentric coordinates associated with as-designed mesh 212A. Barycentric coordinates can be used to better fit the texture island UVI to the corresponding island CI.

In the example shown in FIG. 9, barycentric coordinates for each of correspondence points #1, #3, #5, and #7 for locations in ABM Faces 822, and for faces 512 of as-designed mesh 510, as faces 512 are also associated with texture island 536 as indicated by UVIsland mapping 550 of FIG. 5. Then, as indicated by block 930 at lower right of FIG. 9, computing device 200 can fit projected texture island 536 onto ABM Faces 822 using transformation matrix TM2 generated for correspondence points #1, #3, #5, and #7, as specified in terms of barycentric coordinates. Then, a set of textured ABM Faces 940 is generated by projecting and fitting texture island 536 onto ABM Faces 822, as indicated at lower right of FIG. 9.

In some cases, "dropout regions" or removed portions of a texture are to be avoided. In these cases, computing device 200 can determine transformation matrix TM2 so that texture island UVI remains within the confines of corresponding island CI while getting as close to edges of corresponding island CI as possible.

At block 450 of method 400 illustrated in FIG. 4, computing device 200 generates one or more outputs related to as-built mesh 214. FIG. 10 shows two example outputs related to as-built mesh 214: textured as-built object 1000 and image 1010. Computing device 200 can generate and send one or instructions to one or more texture-application devices (e.g., one or more ink-jet printers, one or more devices for applying vinyl or other material wrap sections corresponding to texture islands, one or more paint sprayers) to direct application of texture islands of texture 530 onto as-built object 610 as the texture islands were projected and fitted onto as-built mesh 620 at block 440 of FIG. 4. FIG. 10 indicates that, upon completion of texture application by the texture-application device(s), as-built object 610 can be transformed into textured as-built object 1000. Image 1010 can be generated by computing device 200 rendering an image of aligned as-built mesh 720 of FIG. 7, after texture mapping aligned as-built mesh 720 with texture islands of texture 530 that have been projected and fit onto corresponding faces of aligned as-built mesh 720 using the procedures of block 440.

At block 460 of method 400 illustrated in FIG. 4, computing device 200 determines whether there are more as-built (or other) meshes to be fitted to texture 212B. If there are more as-built (or other) meshes to be fitted to texture 212B, then computing device 200 proceeds to block 414. Otherwise, there are no more meshes to be fitted to texture 212B, and computing device 200 can terminate execution of method 400 as indicated by the "END" block shown in FIG. 4.

Disclosed embodiments are described above with reference to the accompanying drawings, in which some, but not all of the disclosed embodiments may be shown. Indeed, several different embodiments may be described and should not be construed as limited to the embodiments set forth herein. Rather, these embodiments are described so that this disclosure are thorough and complete and convey the disclosure at least to those skilled in the art.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent from the foregoing descriptions. Such modifications and variations are intended to fall within the scope of the appended claims.

In addition, each block in the disclosed flowcharts may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art. While various aspects and embodiments have been disclosed herein, other aspects and embodiments will be apparent to those skilled in the art.

What is claimed is:

1. A method, comprising:
   receiving, at a computing device, a first mesh representing a first three-dimensional (3D) object, a two-dimensional (2D) texture associated with the first 3D object, and a second mesh representing a second 3D object, wherein the first mesh differs from the second mesh;
   determining one or more correspondence points on each of the first mesh and the second mesh using the computing device;
   aligning the first mesh with the second mesh based on an alignment transformation using the computing device, wherein the alignment transformation is determined based on the one or more correspondence points;
   determining one or more texture portions of the 2D texture associated with one or more corresponding portions of the first mesh using the computing device;
   assigning the one or more texture portions of the 2D texture to one or more corresponding portions of the aligned second mesh using the computing device; and
   for each particular texture portion of the one or more texture portions, the computing device:
      projecting the particular texture portion onto a 2D plane related to a particular corresponding portion of the one or more corresponding portions of the aligned second mesh, and
      fitting the projected particular texture portion to the particular corresponding portion of the aligned second mesh.

2. The method of claim 1, further comprising:
   generating an output of the computing device, the output based on the one or more fitted texture portions.

3. The method of claim 2, wherein generating the output comprises generating at least one of: one or more instructions to apply a texture to the second 3D object in accord with the one or more fitted texture portions, and an image of at least a part of the second 3D object covered by a part of the texture that corresponds to at least part of one or more fitted texture portions.

4. The method of claim 1, wherein the first mesh comprises a first plurality of faces, and wherein determining the one or more texture portions of the 2D texture associated with the one or more corresponding portions of the first mesh comprises determining a mapping of the one or more texture portions to one or more faces of the first plurality of faces.

5. The method of claim 1, wherein receiving the second mesh comprises receiving a scan of the second 3D object, and wherein the second 3D object comprises an object built based on a design represented by the first mesh.

6. The method of claim 1, wherein the second mesh comprises a second plurality of faces, wherein assigning the one or more texture portions of the 2D texture to one or more corresponding portions of the aligned second mesh comprises:

determining a centroid of a second face of the second plurality of faces that is aligned with a first face of the first mesh; and assigning a second texture portion to the second face based on the centroid of the second face.

7. The method of claim 1, wherein the 2D plane related to the particular corresponding portion of the aligned second mesh comprises a 2D plane representing a surface of the first mesh, and wherein projecting the particular texture portion onto the 2D plane related to the particular corresponding portion of the aligned second mesh comprises projecting the particular texture portion onto the 2D plane while maintaining one or more proportions of the surface of the first mesh.

8. The method of claim 7, wherein projecting the particular texture portion onto the 2D plane while maintaining one or more proportions of the surface of the first mesh comprises projecting the particular texture portion onto the 2D plane while maintaining one or more proportions of the surface of the first mesh using a conformal mapping.

9. The method of claim 1, wherein fitting the projected particular texture portion to the particular corresponding portion of the aligned second mesh comprises performing a transform of the particular texture portion to fit the particular corresponding portion of the aligned second mesh, wherein the transform of the particular texture portion comprises one or more of: a rotation of the particular texture portion, a scale of the particular texture portion, and a skew of the particular texture portion.

10. The method of claim 1, wherein determining one or more correspondence points on each of the first mesh and the second mesh comprises determining at least three correspondence points for each texture portion of the one or more texture portions.

11. The method of claim 10, wherein fitting the projected particular texture portion to the particular corresponding portion of the aligned second mesh comprises:

determining one or more barycentric coordinates for a particular texture portion based on the at least three correspondence points for the particular texture portion; and fitting the projected particular texture portion to the particular corresponding portion of the aligned second mesh based on the one or more barycentric coordinates.

12. The method of claim 10, wherein fitting the projected particular texture portion to the particular corresponding portion of the aligned second mesh comprises:

determining a polygon of the second mesh that is adjacent to the particular corresponding portion of the aligned second mesh and is unassociated with the one or more texture portions; and further assigning the projected particular texture portion to the polygon of the second mesh.

13. The method of claim 1, wherein receiving the first mesh comprises receiving a first mesh having a first number of polygons, wherein receiving the second mesh comprises receiving a second mesh having a second number of polygons, and wherein the second number of polygons is at least an order of magnitude larger than the first number of polygons.

14. The method of claim 1, further comprising:

receiving, at the computing device, a third mesh representing a third 3D object, wherein the third mesh is based on a scan of the third 3D object, and wherein the third 3D object differs from the first 3D object and the second 3D object;

determining one or more third correspondence points on each of the first mesh and the third mesh using the computing device;

aligning the first mesh with the third mesh based on a third alignment transformation using the computing device, wherein the third alignment transformation is determined based on the one or more third correspondence points;

assigning the one or more texture portions of the 2D texture to one or more third corresponding portions of the aligned third mesh using the computing device; and for each particular texture portion of the one or more texture portions, the computing device:

projecting the particular texture portion onto a 2D plane related to a particular corresponding third portion of the one or more third corresponding portions of the aligned third mesh, and fitting the projected particular texture portion to the particular corresponding third portion of the aligned third mesh.

15. A system, comprising:

a computing device, comprising:

one or more processors; and one or more non-transitory computer-readable media having computer-readable instructions stored thereon that, when executed by the one or more processors, cause the computing device to perform functions comprising:

receiving a first mesh representing a first three-dimensional (3D) object, a two-dimensional (2D) texture associated with the first 3D object, and a second mesh representing a second 3D object, wherein the first mesh differs from the second mesh;

determining one or more correspondence points on each of the first mesh and the second mesh;

aligning the first mesh with the second mesh based on an alignment transformation, wherein the alignment transformation is determined based on the one or more correspondence points;

determining one or more texture portions of the 2D texture associated with one or more corresponding portions of the first mesh;

assigning the one or more texture portions of the 2D texture to one or more corresponding portions of the aligned second mesh; and for each particular texture portion of the one or more texture portions:

projecting the particular texture portion onto a 2D plane related to a particular corresponding portion of the one or more corresponding portions of the aligned second mesh, and fitting the projected particular texture portion to the particular corresponding portion of the aligned second mesh.

16. The system of claim 15, wherein the functions further comprise:

generating an output comprising at least one of: one or more instructions to apply a texture to the second 3D object in accord with the one or more fitted texture portions, and an image of at least a part of the second 3D object covered by a part of the texture that corresponds to at least part of one or more fitted texture portions.

17. The system of claim 15, wherein the first mesh comprises a first plurality of faces, and wherein determining the one or more texture portions of the 2D texture associated with the one or more corresponding portions of the first mesh comprises determining a mapping of the one or more texture portions to one or more faces of the first plurality of faces.

18. The system of claim 15, further comprising a 3D scanner, and wherein receiving the first mesh, the 2D texture, and the second mesh comprises:
   generating the second mesh by using the 3D scanner to scan the second 3D object; and
   receiving the second mesh at the computing device from the 3D scanner.

19. The system of claim 15, wherein the 2D plane related to the particular corresponding portion of the aligned second mesh comprises a 2D plane representing a face of the first mesh, and
   wherein projecting the particular texture portion onto the 2D plane related to the particular corresponding portion of the aligned second mesh comprises projecting the particular texture portion onto the 2D plane while maintaining one or more proportions of the face of the first mesh.

20. An article of manufacture comprising a non-transitory computer-readable medium having instructions stored thereon that, when executed by one or more processors of a computing device, cause the computing device to perform functions comprising:
   receiving a first mesh representing a first three-dimensional (3D) object, a two-dimensional (2D) texture associated with the first 3D object, and a second mesh representing a second 3D object, wherein the first mesh differs from the second mesh;
   determining one or more correspondence points on each of the first mesh and the second mesh;
   aligning the first mesh with the second mesh based on an alignment transformation, wherein the alignment transformation is determined based on the one or more correspondence points;
   determining one or more texture portions of the 2D texture associated with one or more corresponding portions of the first mesh;
   assigning the one or more texture portions of the 2D texture to one or more corresponding portions of the aligned second mesh; and
   for each particular texture portion of the one or more texture portions:
      projecting the particular texture portion onto a 2D plane related to a particular corresponding portion of the one or more corresponding portions of the aligned second mesh, and
      fitting the projected particular texture portion to the particular corresponding portion of the aligned second mesh.

\* \* \* \* \*